United States Patent
Gil et al.

(10) Patent No.: US 8,241,469 B2
(45) Date of Patent: Aug. 14, 2012

(54) REACTOR COVER AND HYDROGEN GENERATING APPARATUS AND FUEL CELL POWER GENERATION SYSTEM HAVING THE SAME

(75) Inventors: Jae-Hyoung Gil, Seoul (KR); Jae-Hyuk Jang, Seongnam-si (KR); Bo-Sung Ku, Suwon-si (KR); Kyoung-Soo Chae, Suwon-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 1164 days.

(21) Appl. No.: 12/078,867

(22) Filed: Apr. 7, 2008

(65) Prior Publication Data

US 2009/0075132 A1 Mar. 19, 2009

(30) Foreign Application Priority Data

Sep. 18, 2007 (KR) .......................... 10-2007-0094928

(51) Int. Cl.
*C25B 1/04* (2006.01)
*C25B 9/00* (2006.01)
*H01M 8/06* (2006.01)

(52) U.S. Cl. .................. 204/230.8; 204/230.2; 204/248; 204/279; 429/422

(58) Field of Classification Search .......................... None
See application file for complete search history.

(56) References Cited

U.S. PATENT DOCUMENTS

| | | | | |
|---|---|---|---|---|
| 4,278,742 A * | 7/1981 | Oxenreider et al. | ............. | 429/88 |
| 4,436,793 A * | 3/1984 | Adlhart | .......................... | 429/421 |
| 4,662,702 A * | 5/1987 | Furuya | .......................... | 439/630 |
| 5,865,971 A * | 2/1999 | Sunkara | .......................... | 204/404 |
| 6,585,882 B1 * | 7/2003 | Su et al. | ........................ | 205/687 |
| 2007/0272546 A1 | 11/2007 | Mathews | | |
| 2010/0297478 A1* | 11/2010 | Mashiko et al. | .................. | 429/7 |

FOREIGN PATENT DOCUMENTS

JP 2004-200142 A1 * 7/2004
KR 2001-0032162 4/2001

OTHER PUBLICATIONS

U.S. Appl. No. 12/078,868, filed Apr. 7, 2008, Jae-Hyoung Gil, et al., Samsung Electromechanics Co., Ltd.
Korean Office Action issued Oct. 30, 2009 in related Korean Patent Application 10-2007-0095692.
U.S. Office Action mailed Sep. 21, 2010 in related U.S. Appl. No. 12/078,868.

* cited by examiner

*Primary Examiner* — Harry D Wilkins, III

(57) ABSTRACT

A reactor cover, and a hydrogen generating apparatus and a fuel cell power generation system having the reactor cover are disclosed. The reactor cover includes a base panel; a control unit, which is coupled to one side of the base panel, and which regulates a reaction for generating the hydrogen; a circuit pattern buried in the base panel in electrical connection with the control unit; and an electrode pad formed on the other side of the base panel in electrical connection with the circuit pattern. In the reactor cover, the base panel and the control unit may be integrated, to eliminate unnecessary wiring, prevent short-circuiting, and consequently provide a reactor cover that can be fabricated and used more easily.

21 Claims, 3 Drawing Sheets

REACTOR COVER AND HYDROGEN GENERATING APPARATUS AND FUEL CELL POWER GENERATION SYSTEM HAVING THE SAME

CROSS-REFERENCE TO RELATED APPLICATIONS

This application claims the benefit of Korean Patent Application No. 10-2007-0094928 filed with the Korean Intellectual Property Office on Sep. 18, 2007, the disclosure of which is incorporated herein by reference in its entirety.

BACKGROUND

1. Technical Field

The present invention relates to a reactor cover, and to a hydrogen generating apparatus and fuel cell power generation system having the same.

2. Description of the Related Art

A fuel cell is an apparatus that converts the chemical energies of fuel (hydrogen, LNG, LPG, etc.) and air directly into electricity and heat, by means of electrochemical reactions. In contrast to conventional power generation techniques, which employ the processes of burning fuel, generating vapor, driving turbines, and driving power generators, the utilization of fuel cells does not entail combustion processes. As such, the fuel cell is a relatively new technology for generating power, which offers high efficiency and few environmental problems.

Examples of fuel cells being researched for application to portable electronic devices include the polymer electrolyte membrane fuel cell (PEMFC), which uses hydrogen as fuel, and the direct liquid fuel cell, such as the direct methanol fuel cell (DMFC), which uses liquid fuel directly. The PEMFC provides a high output density, but requires a separate apparatus for supplying hydrogen. Using a hydrogen storage tank, etc., for supplying the hydrogen can result in a large volume and can require special care in handling and keeping.

Methods used in generating hydrogen for a polymer electrolyte membrane fuel cell (PEMFC) can be divided mainly into methods utilizing the oxidation of aluminum, methods utilizing the hydrolysis of metal borohydrides, and methods utilizing reactions on metal electrodes. Among these, one method of efficiently regulating the rate of hydrogen generation is the method of using metal electrodes. This is a method in which the electrons obtained when magnesium in the electrode 220 is ionized to $Mg^{2+}$ ions are moved through a wire and connected to another metal object, where hydrogen is generated by the dissociation of water. The amount of hydrogen generated can be regulated, as it is related to the distance between electrodes and the sizes of the electrodes.

In the method of generating hydrogen according to the related art, however, the control unit, for regulating the amount of hydrogen generated, and the reactor are separate, and are connected with wires. As such, the reactor and the control unit are implemented separately, and there is a risk of hydrogen leaking out from the holes formed in the reactor to allow the wires to pass through. Thus, there is a need for a reactor cover that has an integrated control unit, as well as for a hydrogen generating apparatus and a fuel cell power generation system having the reactor cover.

SUMMARY

An aspect of the invention is to provide a reactor cover, and a hydrogen generating apparatus and a fuel cell power generation system having the reactor cover, which can be easily manufactured and used, by integrating the base panel and the control unit to eliminate unnecessary wiring.

One aspect of the invention provides a reactor cover in an apparatus for generating hydrogen by dissociating an electrolyte solution. The reactor cover includes: a base panel; a control unit, which is coupled to one side of the base panel, and which regulates a reaction for generating the hydrogen; a circuit pattern buried in the base panel in electrical connection with the control unit; and an electrode pad formed on the other side of the base panel in electrical connection with the circuit pattern.

A securing indentation may be formed in one side of the base panel in which the control unit may be inserted.

The thickness of the control unit may be less than or equal to the depth of the securing indentation.

The base panel may include at least one of a ceramic and a polymer.

At least one electrode indentation may be formed in the other side of the base panel, in which the electrode pad may be formed.

On one surface of the electrode pad, a gold (Au) layer may be formed.

The electrode pad may be in the form of a socket that secures a conductive body to the base panel.

In certain embodiments, the reactor cover may further include a waterproof layer formed on the other side of the base panel such that the electrode pad is exposed, where the waterproof layer may prevent the electrolyte solution from penetrating into the base panel.

Another aspect of the invention provides a hydrogen generating apparatus, for generating hydrogen by dissociating an electrolyte solution, which includes: a base panel; a control unit, which is coupled to one side of the base panel, and which regulates a reaction for generating the hydrogen; a circuit pattern buried in the base panel in electrical connection with the control unit; electrode pads formed on the other side of the base panel in electrical connection with the circuit pattern; an anode coupled to some of the electrode pads that generates electrons; a cathode coupled to others of the electrode pads that receives the electrons from the anode to generate hydrogen; and a reactor, in which an opening is formed, and which is coupled with the base panel, such that the anode and the cathode are held within the reactor.

A securing indentation may be formed in one side of the base panel in which the control unit may be inserted.

The thickness of the control unit may be less than or equal to the depth of the securing indentation.

The base panel may include at least one of a ceramic and a polymer.

At least one electrode indentation may be formed in the other side of the base panel, in which at least one of the electrode pads may be formed.

On the ends of the anode and cathode and/or on one surface of at least one of the electrode pads, a gold (Au) layer may be formed.

At least one of the electrode pads may be in the form of a socket that secures the anode and the cathode to the base panel.

A waterproof layer may further be included, which is formed on the other side of the base panel such that the electrode pads are exposed, and which prevents the electrolyte solution from penetrating into the base panel.

Yet another aspect of the invention provides a fuel cell power generation system, for producing electrical energy using hydrogen generated by dissociating an electrolyte solution, which includes: a base panel; a control unit, which is coupled to one side of the base panel, and which regulates a reaction for generating the hydrogen; a circuit pattern buried in the base panel in electrical connection with the control unit; electrode pads formed on the other side of the base panel in electrical connection with the circuit pattern; an anode coupled to at least one of the electrode pads that generates electrons; a cathode coupled to at least one of the others of the electrode pads and that receives the electrons from the anode to generate hydrogen; a reactor, in which an opening is formed, and which is coupled with the base panel, such that the anode and the cathode are held within the reactor; and a fuel cell configured to convert chemical energy of the hydrogen generated at the cathode to the electrical energy.

A securing indentation may be formed in one side of the base panel in which the control unit may be inserted.

The thickness of the control unit may be less than or equal to the depth of the securing indentation.

The base panel may include at least one of a ceramic and a polymer.

At least one electrode indentation may be formed in the other side of the base panel, in which at least one of the electrode pads may be formed.

On the ends of the anode and cathode and/or on one surface of at least one of the electrode pads, a gold (Au) layer may be formed.

At least one of the electrode pads may be in the form of a socket that secures the anode and the cathode to the base panel.

A waterproof layer may further be included, which is formed on the other side of the base panel such that the electrode pads are exposed, and which prevents the electrolyte solution from penetrating into the base panel.

Additional aspects and advantages of the present invention will be set forth in part in the description which follows, and in part will be obvious from the description, or may be learned by practice of the invention.

DETAILED DESCRIPTION

Embodiments of the reactor cover, as well as the hydrogen generating apparatus and the fuel cell power generation system having the reactor cover, according to certain aspects of the invention will be described below in more detail with reference to the accompanying drawings, in which those components are rendered the same reference number that are the same or are in correspondence, regardless of the figure number, and redundant explanations are omitted.

Figure 1:
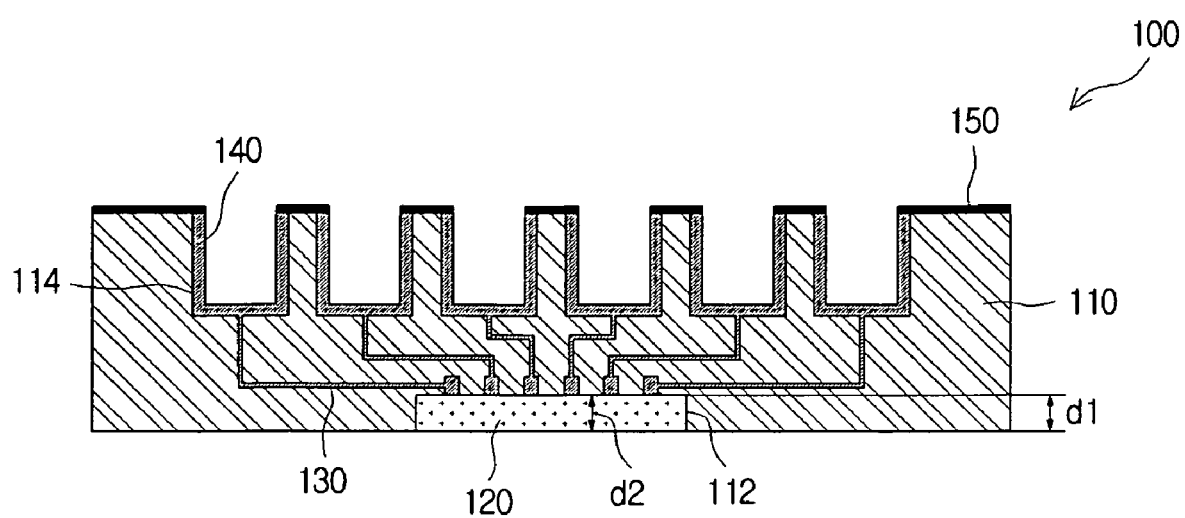
FIG. 1 is a cross-sectional view illustrating an embodiment of a reactor-cover according to an aspect of the invention.

FIG. 1 is a cross-sectional view illustrating an embodiment of a reactor cover according to an aspect of the invention. In FIG. 1 are illustrated a reactor cover 100, a base panel 110, a securing indentation 112, electrode indentations 114, a control unit 120, a circuit pattern 130, electrode pads 140, and a waterproof layer 150.

In this particular embodiment, a reactor cover 100 is presented that can be implemented as a simpler structure, by integrating the control unit 120 with the base panel 110.

A securing indentation 112 may be formed in one side of the base panel 110, while electrode indentations 114 may be formed in the other side, where the control unit 120 may be inserted and coupled in the securing indentation 112, and electrode pads 140 may be formed in the electrode indentations 114.

Also, the base panel 110 can be made including at least one of a ceramic and a polymer. That is, the base panel 110 can be made of ceramics or polymers, or can be made including these both.

The base panel 110 can be an insulation substrate, which forms a part of a PCB (printed circuit board) or an LTCC (low temperature co-fired ceramic). An insulation substrate made of a polymer or a ceramic can be fashioned into a PCB or an LTCC, by forming a conductive pattern on the inside and/or on the outside, and applying various mechanical processing, which can be used for the reactor cover 100, whereby the reactor cover 100 having an integrated control unit 120 can be implemented in a much simpler manner.

The control unit 120 may be coupled to one side of the base panel 110 to control the reaction for generating hydrogen. That is, as described above, a securing indentation 112 may be formed in the base panel 110, and the control unit 120 may be integrated with the base panel 110 by inserting the control unit 120 in the securing indentation 112.

The control unit 120 may be electrically connected, by way of the electrode pads 140, with the anodes and cathodes of a hydrogen generating apparatus, and may control the flow of electricity between the anodes and the cathodes. That is, the control unit 120 may be inputted with the amount of hydrogen required by a fuel cell, and if the required value is high, may increase the amount of electrons flowing from the anodes to the cathodes, or if the required value is low, may decrease the amount of electrons flowing from the anodes to the cathodes.

For example, the control unit 120 may include a variable resistance, to regulate the electric current flowing between the anodes and cathodes by varying the resistance value, or may include an on/off switch, to regulate the electric current flowing between the anodes and cathodes by controlling the on/off timing.

Furthermore, the thickness d2 of the control unit 120 can be less than or equal to the depth d1 of the securing indentation 112, so that the control unit 120 does not protrude out at the side of the base panel 110. Then, the side of the base panel 110 may be used as the bottom surface of the hydrogen generating apparatus, for easier coupling to another system.

The securing indentation 112 can be formed in one side of the base panel 110 by a processing including, for example, laser drilling and routing, etc. The control unit 120 can then be mounted in this securing indentation 112.

The circuit pattern 130 may be formed in the base panel 110 in electrical connection with the control unit 120. In this way, the control unit 120 and the anodes and cathodes of the hydrogen generating apparatus may be electrically connected.

The electrode pads 140 may be formed on the other side of the base panel 110 such that the electrode pads 140 are electrically connected with the circuit pattern 130. Electrode indentations 114 may be formed in the other side of the base panel 110, and the electrode pads 140 may be formed in the electrode indentations 114. By way of the electrode pads 140, the anodes and cathodes of the hydrogen generating apparatus may be secured to the reactor cover 100 more effectively.

Similar to forming the securing indentation 112 described above, the electrode indentations 114 may be formed by processing the other side of the base panel 110, for example, by laser drilling and routing, etc.

Also, the electrode pads 140 may have the form of sockets, in which conductive bodies can be inserted, such as the anodes and cathodes of the hydrogen generating apparatus, so that the conductive bodies can be secured to the base panel 110. As such, the electrode pads 140 may serve to secure the anodes and cathodes to the reactor cover 100, while at the same time, due to the flexibility of the sockets themselves, the anodes and cathodes can be coupled to the reactor cover 100 in a more flexible manner without significant contact resistance.

In addition, a gold (Au) layer may be formed on one surface of the electrode pads 140, so that a conductive body, such as an anode or cathode of the hydrogen generating apparatus, can readily be coupled by soldering this gold layer, to secure the conductive body, e.g. the anode or cathode of the hydrogen generating apparatus, onto the electrode pads 140.

The circuit pattern 130 and electrode pads 140 can be formed using a technique for manufacturing a multilayer PCB or LTCC. The following will described one example of using a technique for manufacturing a multilayer PCB. First, a conductive material, which is to become the circuit pattern 130, may be formed on an insulation substrate, e.g. a ceramic or polymer substrate, and then exposure and development and selective etching may be performed in accordance to a photolithography process, to form a particular pattern.

Next, another insulation substrate may be stacked on one side of the insulation substrate, on which a particular pattern has been formed, to form the base panel 110, and then the securing indentation 112 and electrode indentations 114 may be formed in either side. The method of forming the securing indentation 112 and electrode indentations 114 may be as described above.

Next, via holes may be formed in one side of each of the electrode indentations 114 and the securing indentation 112, for example, using laser drilling, etc., and a plating layer may be formed by a method of plating, etc., in the via holes and on both sides of the base panel 110.

Finally, both sides of the base panel 110 may be selectively etched, to form the electrode pads 140, for electrical connection with the anodes and cathodes of the hydrogen generating apparatus, and the conductive pattern, for electrical connection with the control unit 120.

A waterproof layer 150 may be formed on the other side of the base panel 110 with the electrode pads 140 exposed, and may prevent the electrolyte solution from penetrating into the base panel 110. The waterproof layer 150 may be formed for a more stable electrical contact, as the other side of the base panel 110 can be exposed to the electrolyte solution contained in the reactor of the hydrogen generating apparatus.

According to this embodiment, unnecessary wiring can be eliminated, by integrating the control unit 120 with the base panel 110 and by forming the circuit pattern 130 within the base panel 110, and the anodes and cathodes can be secured with greater ease, by forming the electrode pads 140 to have a socket structure. Also, a waterproof layer 150 may be formed on the other side of the base panel 110, to protect the electrical contacts.

Next, an embodiment will be described of a hydrogen generating apparatus according to another aspect of the present invention.

Figure 2:
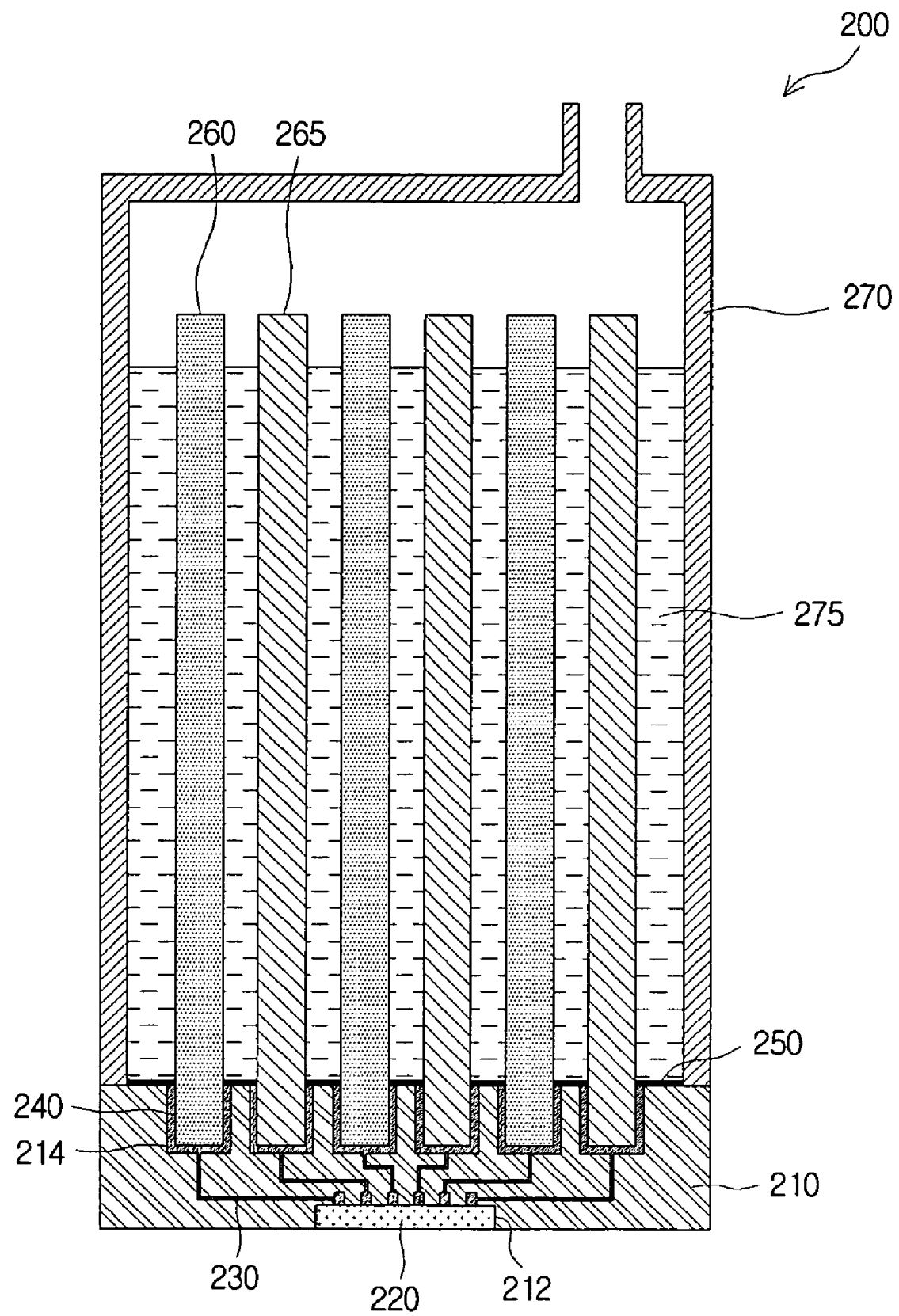
FIG. 2 is a cross-sectional view illustrating an embodiment of a hydrogen generating apparatus according to another aspect of the invention.

FIG. 2 is a cross-sectional view illustrating an embodiment of a hydrogen generating apparatus according to another aspect of the invention. In FIG. 2 are illustrated a hydrogen generating apparatus 200, a base panel 210, a securing indentation 212, electrode indentations 214, a control unit 220, a circuit pattern 230, electrode pads 240, a waterproof layer 250, anodes 260, cathodes 265, an electrolyte solution 275, and a reactor 270.

In this particular embodiment, a hydrogen generating apparatus 200 is presented that can be implemented as a simpler structure, by integrating the control unit 220 with the base panel 210.

In this embodiment, the composition and coupling relationships of the base panel 210, securing indentation 212, electrode indentations 214, control unit 220, circuit pattern 230, electrode pads 240, and waterproof layer 250 are substantially the same as or are in correspondence with those of the embodiment described above for a reactor cover 100 (FIG. 1) according to an aspect of the invention, and thus will not be described again. The descriptions that follow will focus on the anodes 260, cathodes 265, and reactor 270, which form the differences from the previously described embodiment.

The reactor 270 may have an opening and may contain an electrolyte solution 275 that produces hydrogen by dissociation. An opening may be formed in one side of the reactor 270 at which the base panel 210 may be coupled, such that the reactor 270 holds the anodes 260 and cathodes 265.

The reactor 270 may be coupled to the reactor cover physically or chemically. For example, the method used may involve fastening with bolts after placing a rubber ring between the reactor 270 and the reactor cover to form a seal, or coupling the reactor 270 and reactor cover by way of a resin such as epoxy, etc., interposed in-between.

The anodes 260 and cathodes 265 may be held inside the reactor 270, and thus a reaction for generating hydrogen may be performed from the electrolyte solution 275 contained in the electrolyte bath. Here, a compound such as LiCl, KCl, NaCl, $KNO_3$, $NaNO_3$, $CaCl_2$, $MgCl_2$, $K_2SO_4$, $Na_2SO_4$, $MgSO_4$, AgCl, etc., can be used in the electrolyte solution 275, and the electrolyte solution 275 may contain hydrogen ions.

The anodes 260 may be active electrodes, and may be coupled to some of the electrode pads 240 to generate electrons. The anodes 260 can be made, for example, of magnesium (Mg), and due to the difference in ionization tendency between the anodes 260 and hydrogen, the anodes 260 may release electrons into the water and may be oxidized into magnesium ions ($Mg^{2+}$).

The electrons generated may travel to the control unit 220 electrically connected by the electrode pads 240 with the anodes 260, and to the cathodes 265 electrically connected by the electrode pads 240 with the control unit 280. As such, the anodes 260 may be expended in accordance with the electrons generated, and may be configured to allow replacement after a certain period of time. Also, the anodes 260 may be made of a metal having a greater tendency to ionize than the material used for the cathodes 265 described below.

The cathodes 265 may be inactive electrodes and may not be expended, unlike the anodes 260, and thus the cathodes 265 may be implemented with a lower thickness than that of the anodes 260. The cathodes 265 may be coupled to those of the electrode pads 240 to which the anodes 260 are not coupled, and may receive the electrons generated at the anodes 260 to generate hydrogen. The cathodes 265 can be made, for example, of stainless steel, and may react with the electrons to generate hydrogen. That is, the chemical reaction at the cathodes 265 involves water being dissociated to form hydrogen at the cathodes 265 after receiving the electrons from the anodes 260.

The reaction above can be represented by the following Reaction Scheme 1.

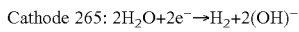

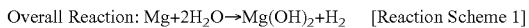  [Reaction Scheme 1]

Also, on one end of each of the anodes 260 and cathodes 265, on one surface of each of the electrode pads 240, or on both the ends of the anodes 260 and cathodes 265 and the surfaces of the electrode pads 240, a gold layer may be formed. Thus, the ends of the anodes 260 and cathodes 265 of the hydrogen generating apparatus 200 and the surfaces of the electrode pads 240 can readily be coupled by soldering the gold layers, to secure the anodes and cathodes of the hydrogen generating apparatus to the electrode pads 140.

In such cases, the gold (Au) layer can be formed on the ends of the anodes 260 and cathodes 265 by sputtering, for example.

According to this embodiment, unnecessary wiring can be eliminated, by integrating the control unit 220 with the base panel 210 and by forming the circuit pattern 230 within the base panel 210, and the anodes 260 and cathodes 265 can be secured with greater ease, by forming the electrode pads 240 to have a socket structure, while a gold layer may be formed on the anodes 260 and cathodes 265 for easier soldering.

Next, an embodiment will be described of a fuel cell power generation system according to yet another aspect of the present invention.

Figure 3:
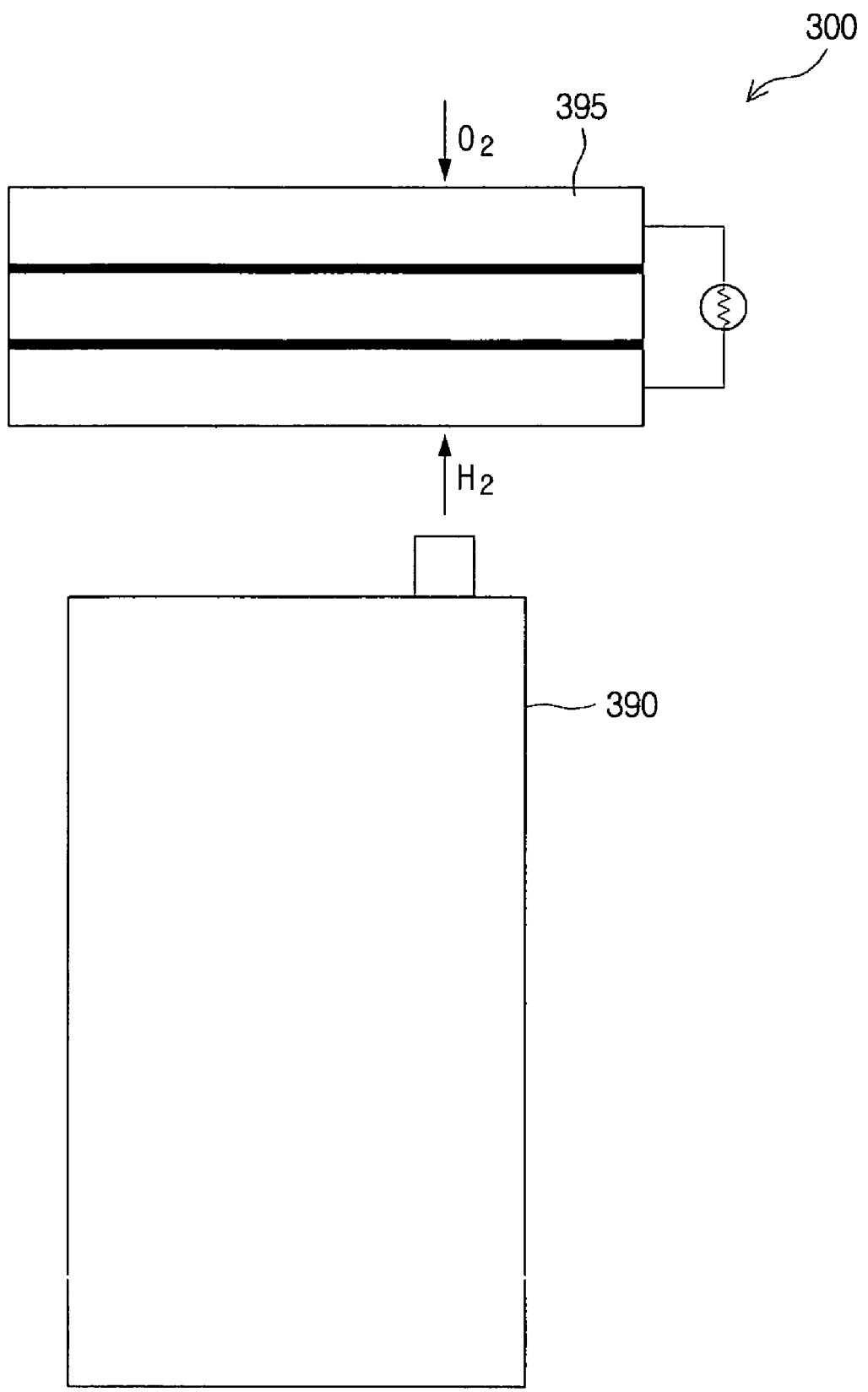
FIG. 3 is a schematic diagram illustrating an embodiment of a fuel cell power generation system according to yet another aspect of the invention.

FIG. 3 is a schematic diagram illustrating an embodiment of a fuel cell power generation system according to yet another aspect of the invention. In FIG. 3, there are illustrated a fuel cell power generation system 300, a hydrogen generating apparatus 390, and a fuel cell 395.

In this particular embodiment, a fuel cell power generation system 300 is presented that can be implemented as a simpler structure, by integrating the control unit with the base panel.

In this embodiment, the composition of the hydrogen generating apparatus 390 is substantially the same as or is in correspondence with that of the embodiment described above for a hydrogen generating apparatus 200 (FIG. 2) according to another aspect of the invention, and thus will not be described again. The descriptions that follow will focus on the fuel cell 395, which forms the difference from the previously described embodiment.

The fuel cell 395 can convert the chemical energy of hydrogen generated at the cathode to produce electrical energy. That is, the hydrogen generated at the hydrogen generating apparatus 390 can be moved to the fuel electrode of the fuel cell, where the chemical energy of the hydrogen generated at the hydrogen generating apparatus 390 described above may be converted into electrical energy to produce a direct current.

According to this embodiment, a fuel cell power generation system 300 can be implemented in a simpler and easier way, by forming the system using a reactor cover having an integrated control unit.

As set forth above, by integrating the base panel and the control unit, unnecessary wiring may be eliminated, and short-circuiting may be prevented, so that consequently, the reactor cover can be fabricated and used more easily.

While the spirit of the invention has been described in detail with reference to particular embodiments, the embodiments are for illustrative purposes only and do not limit the invention. It is to be appreciated that those skilled in the art can change or modify the embodiments without departing from the scope and spirit of the invention.

What is claimed is:

1. A reactor cover in an apparatus for generating hydrogen by dissociating an electrolyte solution, the reactor cover comprising:
   a circuit board; and
   a control unit coupled to the circuit board and configured to regulate a reaction for generating the hydrogen,
   wherein the circuit board comprises
      a base panel;
      a circuit pattern buried in the base panel; and
      an electrode pad formed on one side of the base panel in electrical connection with the circuit pattern, and
      the circuit board is a printed circuit board (PCB) or a low temperature co-fired ceramic (LTCC) substrate, the base panel of the PCB including a polymer and the base panel of the LTCC substrate including a ceramic, and
      the control unit is coupled to the other side of the base panel in electrical connection with the circuit pattern.

2. The reactor cover of claim 1, wherein a securing indentation is formed in the other side of the base panel, and the control unit is inserted in the securing indentation.

3. The reactor cover of claim 2, wherein a thickness of the control unit is less than or equal to a depth of the securing indentation.

4. The reactor cover of claim 1, wherein at least one electrode indentation is formed in one side of the base panel, and the electrode pad is formed in the electrode indentation.

5. The reactor cover of claim 1, wherein a gold (Au) layer is formed on one surface of the electrode pad.

6. The reactor cover of claim 1, wherein the electrode pad is a socket configured to secure a conductive body to the base panel.

7. The reactor cover of claim 1, further comprising:
   a waterproof layer formed on one side of the base panel such that the electrode pad is exposed, the waterproof layer configured to prevent the electrolyte solution from penetrating into the base panel.

8. A hydrogen generating apparatus for generating hydrogen by dissociating an electrolyte solution, the hydrogen generating apparatus comprising:
   a circuit board;
   a control unit coupled to the circuit board and configured to regulate a reaction for generating the hydrogen;
   an anode coupled to the circuit board and configured to generate electrons;
   a cathode coupled to circuit board and configured to receive the electrons from the anode to generate hydrogen; and
   a reactor having an opening formed therein and coupled with the circuit board such that the anode and the cathode are held within the reactor,
   wherein the circuit board comprises
      a base panel;
      a circuit pattern buried in the base panel;
      electrode pads formed on one side of the base panel in electrical connection with the circuit pattern,
      the circuit board is a printed circuit board (PCB) or a low temperature co-fired ceramic (LTCC) substrate, the base panel of the PCB including a polymer and the base panel of the LTCC substrate including a ceramic,
      the control unit is coupled to the other side of the base panel in electrical connection with the circuit pattern,
      the anode is coupled to at least one of the electrode pads,
      the cathode is coupled to at least one of the others of the electrode pads, and
      the reactor is coupled with the base panel.

9. The hydrogen generating apparatus of claim 8, wherein a securing indentation is formed in the other side of the base panel, and the control unit is inserted in the securing indentation.

10. The hydrogen generating apparatus of claim 9, wherein a thickness of the control unit is less than or equal to a depth of the securing indentation.

11. The hydrogen generating apparatus of claim 8, wherein at least one electrode indentation is formed in one side of the base panel, and the electrode pads are formed in the electrode indentation.

12. The hydrogen generating apparatus of claim 8, wherein a gold (Au) layer is formed on at least one of one end of each of the anode and the cathode and one surface of at least one of the electrode pads.

13. The hydrogen generating apparatus of claim 8, wherein at least one of the electrode pad is a socket configured to secure the anode and the cathode to the base panel.

14. The hydrogen generating apparatus of claim 8, further comprising:
a waterproof layer formed on one side of the base panel such that the electrode pads are exposed, the waterproof layer configured to prevent the electrolyte solution from penetrating into the base panel.

15. A fuel cell power generation system for producing electrical energy using hydrogen generated by dissociating an electrolyte solution, the fuel cell power generation system comprising:
a circuit board;
a control unit coupled to the circuit board and configured to regulate a reaction for generating the hydrogen;
an anode coupled to the circuit board and configured to generate electrons;
a cathode coupled to circuit board and configured to receive the electrons from the anode to generate hydrogen;
a reactor having an opening formed therein and coupled with the circuit board such that the anode and the cathode are held within the reactor; and
a fuel cell configured to convert chemical energy of the hydrogen generated at the cathode to the electrical energy,
wherein the circuit board comprises
a base panel;
a circuit pattern buried in the base panel; and
electrode pads formed on one side of the base panel in electrical connection with the circuit pattern,
the circuit board is a printed circuit board (PCB) or a low temperature co-fired ceramic (LTCC) substrate, the base panel of the PCB including a polymer and the base panel of the LTCC substrate including a ceramic,
the control unit is coupled to the other side of the base panel in electrical connection with the circuit pattern,
the anode is coupled to at least one of the electrode pads,
the cathode is coupled to at least one of the others of the electrode pads, and
the reactor is coupled with the base panel.

16. The fuel cell power generation system of claim 15, wherein a securing indentation is formed in the other side of the base panel, and the control unit is inserted in the securing indentation.

17. The fuel cell power generation system of claim 16, wherein a thickness of the control unit is less than or equal to a depth of the securing indentation.

18. The fuel cell power generation system of claim 15, wherein at least one electrode indentation is formed in one side of the base panel, and the electrode pads are formed in the electrode indentation.

19. The fuel cell power generation system of claim 15, wherein a gold (Au) layer is formed on at least one of one end of each of the anode and the cathode and one surface of at least one of the electrode pads.

20. The fuel cell power generation system of claim 15, wherein at least one of the electrode pads is a socket configured to secure the anode and the cathode to the base panel.

21. The fuel cell power generation system of claim 15, further comprising:
a waterproof layer formed on one side of the base panel such that the electrode pads are exposed, the waterproof layer configured to prevent the electrolyte solution from penetrating into the base panel.

* * * * *